United States Patent
Mack

(10) Patent No.: US 11,800,854 B1
(45) Date of Patent: Oct. 31, 2023

(54) LIVESTOCK WARMING AND COOLING SYSTEM

(71) Applicant: Jerome I. Mack, Leola, SD (US)

(72) Inventor: Jerome I. Mack, Leola, SD (US)

(*) Notice: Subject to any disclaimer, the term of this patent is extended or adjusted under 35 U.S.C. 154(b) by 849 days.

(21) Appl. No.: 16/674,241

(22) Filed: Nov. 5, 2019

(51) Int. Cl.
*A01K 29/00* (2006.01)
*F25B 30/06* (2006.01)
*A01K 1/00* (2006.01)

(52) U.S. Cl.
CPC .............. *A01K 29/00* (2013.01); *F25B 30/06* (2013.01); *A01K 1/0076* (2013.01)

(58) Field of Classification Search
CPC ........ A01K 29/00; F25B 30/06; A01K 1/0076; A61F 7/00; A61F 2007/0001; A61F 2007/0054; A61F 7/0085; A61F 2007/0266; A61F 2007/0295
See application file for complete search history.

(56) References Cited

U.S. PATENT DOCUMENTS

| | | | |
|---|---|---|---|
| 3,028,097 | A | 4/1962 | Johnson |
| 3,995,592 | A | 12/1976 | Goldstaub et al. |
| 4,013,044 | A | 3/1977 | Shaw |
| 4,252,082 | A | 2/1981 | Herring |
| 6,116,190 | A | 9/2000 | Kitt |
| 2008/0266115 | A1 | 10/2008 | Labrecque et al. |
| 2009/0020173 | A1* | 1/2009 | Lau et al. ............. F04D 27/00 137/565.01 |
| 2012/0125264 | A1 | 5/2012 | Veng |
| 2014/0374056 | A1* | 12/2014 | Choi et al. .......... A01K 1/0158 165/46 |

FOREIGN PATENT DOCUMENTS

| | | | |
|---|---|---|---|
| CN | 201398362 | Y | 2/2010 |
| CN | 206641149 | U | 11/2017 |
| CN | 107771685 | A | 3/2018 |
| CN | 108029560 | A | 5/2018 |
| CN | 109362575 | A | 2/2019 |
| EP | 1174025 | A2 | 1/2002 |
| EP | 2123150 | B1 | 11/2010 |
| JP | 5094942 | B2* | 12/2012 |
| KR | 101606323 | B1 | 3/2016 |
| KR | 101895770 | B1 | 9/2018 |
| WO | 8900003 | A1 | 1/1989 |

* cited by examiner

*Primary Examiner* — Miguel A Diaz
*Assistant Examiner* — Ibrahim A Michael Adeniji
(74) *Attorney, Agent, or Firm* — Jeffrey A. Proehl; Woods, Fuller, Shultz & Smith, PC

(57) ABSTRACT

A system for transferring heat between a first livestock animal and a second livestock animal may include a first element positionable adjacent to the first livestock animal to transfer heat from a first fluid to a first thermally conductive surface on the first element, a second element positionable adjacent to the second livestock animal to transfer heat from a second fluid to a second thermally conductive surface on the second element, and a heat exchange assembly configured to transfer heat to the first fluid from the second fluid. The heat exchange assembly may include a first heat exchanger receiving the first fluid from the first element, a second heat exchanger receiving the second fluid from the second element, and a refrigeration apparatus utilizing a refrigerant to exchange heat between the first and second heat exchangers.

9 Claims, 3 Drawing Sheets

LIVESTOCK WARMING AND COOLING SYSTEM

BACKGROUND

Field

The present disclosure relates to environmental systems for livestock, and more particularly pertains to a new livestock warming and cooling system for transferring heat from an animal in need of cooling to an animal in need of warming.

SUMMARY in one aspect, the present disclosure relates to a system for transferring heat between a body of a first livestock animal and a body of a second livestock animal. The system may comprise a first element positionable adjacent to the first livestock animal and configured transfer heat from a first fluid to a first thermally conductive surface for placing in contact with the body of the first livestock animal, and a second element positionable adjacent to the second livestock animal and configured to transfer heat from a second fluid to a second thermally conductive surface for placing in contact with the body of the second livestock animal. The system may also comprise a heat exchange assembly configured to transfer heat to the first fluid from the second fluid, the heat exchange assembly being in fluid communication with the first element to receive the first fluid from the first element, with the heat exchange assembly being in fluid communication with the second element to receive the second fluid from the second element. The heat exchange assembly may comprise a first heat exchanger configured to receive the first fluid from the first element, a second heat exchanger configured to receive the second fluid from the second element, and a refrigeration apparatus utilizing a refrigerant to exchange heat between the first and second heat exchangers. The refrigeration apparatus may comprise a condenser in thermal communication with the first heat exchanger to transfer heat from the refrigerant to the first fluid via the first heat exchanger, an evaporator in thermal communication with the second heat exchanger to transfer heat from the second fluid to the refrigerant via the second heat exchanger, a compressor in fluid communication with the condenser and the evaporator to conduct refrigerant from the evaporator to the condenser and compress the refrigerant moving from the evaporator to the condenser, and an expansion valve in fluid communication with the condenser and the evaporator to receive refrigerant from the condenser and provide the refrigerant to the evaporator and reduce a pressure of the refrigerant.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
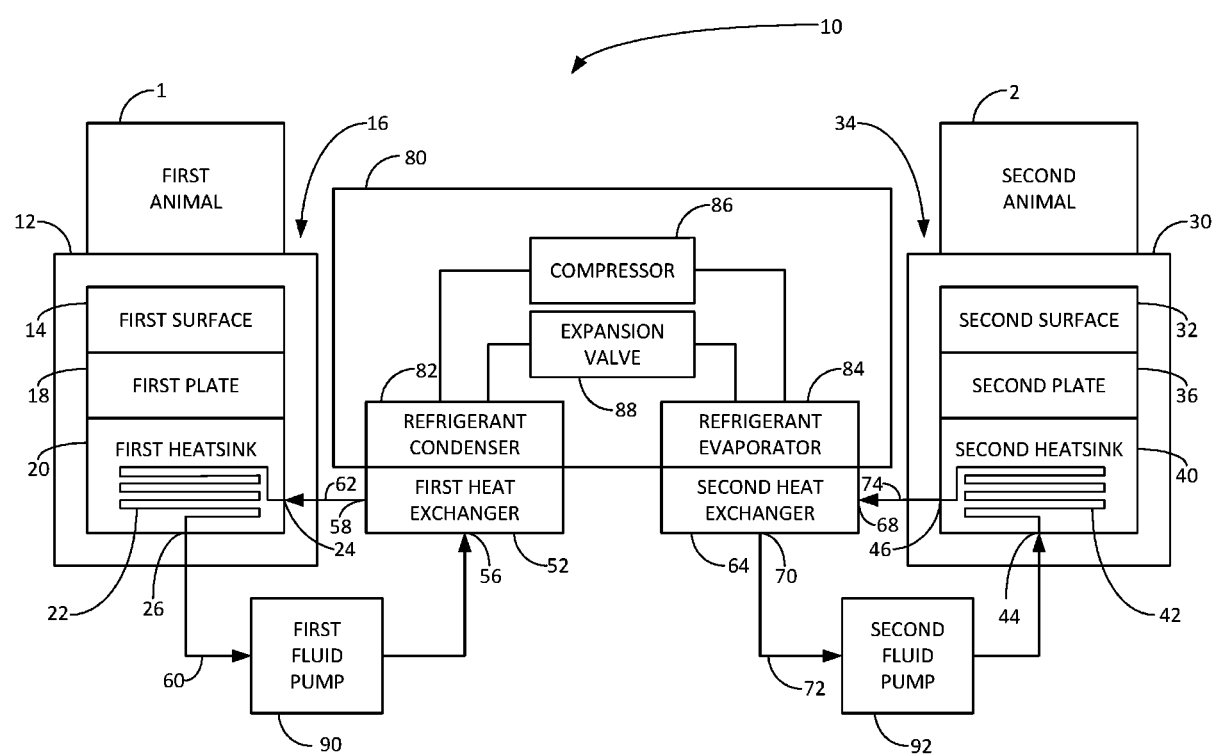
FIG. 1 is a schematic diagram of an embodiment of a new livestock warming and cooling system according to the present disclosure.
Figure 2:
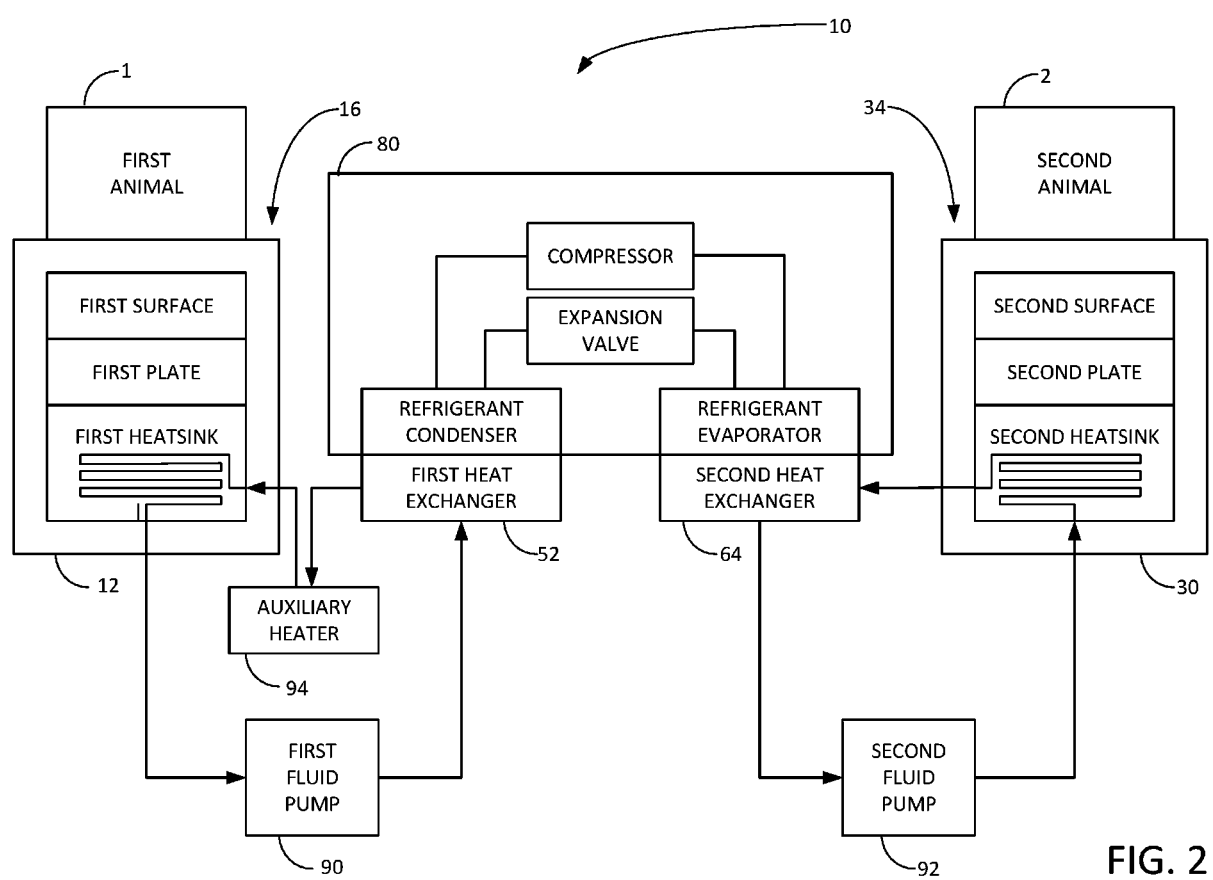
FIG. 2 is a schematic diagram of an embodiment of the livestock warming and cooling system with optional features, according to an illustrative embodiment.
Figure 3:
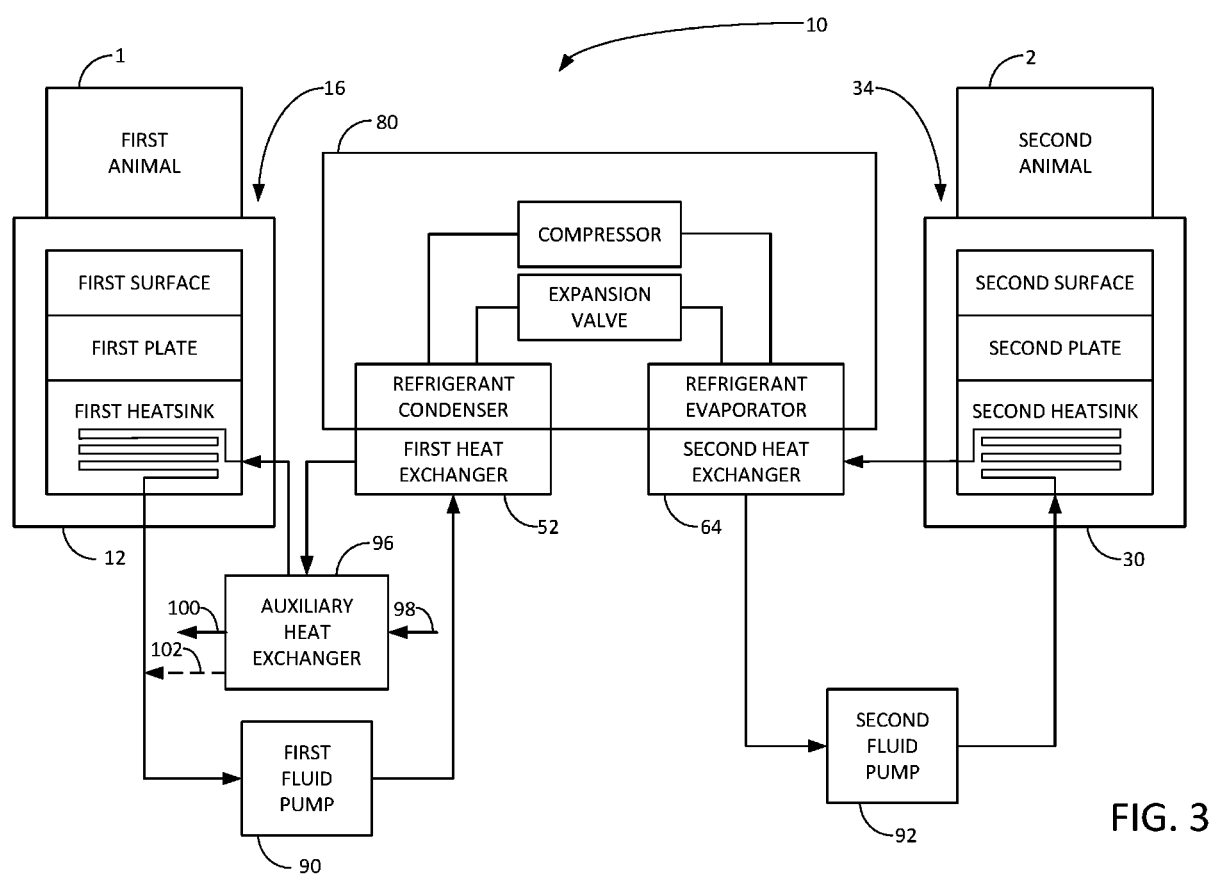
FIG. 3 is a schematic diagram of an embodiment of the livestock warming and cooling system with optional features, according to an illustrative embodiment.

With reference now to the drawings, and in particular to FIGS. 1 through 3 thereof, a new livestock warming and cooling system embodying the principles and concepts of the disclosed subject matter will be described.

In one aspect, disclosure relates to a system 10 for transferring heat between a body of a first livestock animal and a body of a second livestock animal 2 (see, for example, FIG. 1). In some implementations, the first livestock animal 1 may be a relatively younger or smaller animal generally in need of heating of the animal's body, and the second livestock animal may be an older adult or larger animal generally in need of cooling, or may simply benefit from cooling. Illustratively, the first livestock animal may be a juvenile pig or piglet, and the second livestock animal may be an adult pig, such as a sow.

The system 10 may comprise a first element 12 which is positionable adjacent to the body of the first livestock animal 1 and is configured to transfer heat from a first fluid to the body of the first livestock animal 1. The first element 12 may have a first thermally conductive surface 14 for placing in contact with the body of the first livestock animal. Illustratively, the first fluid may include water, although other suitable fluids may be utilized.

The first element 12 may include a first support 16 which may have the first thermally conductive surface 14 formed thereon, and may also include a first heatsink 20 which is in a thermally conductive relationship with the thermally conductive surface 14, such as may be provided on a first plate 18. The first plate 18 may be formed of any suitable thermally conductive material, such as aluminum. Optionally, the first thermally conductive surface 14 may be formed directly on the first heatsink 20. The first heatsink 20 may have a first heatsink fluid passage 22 which is configured to carry or conduct the first fluid in a thermally conductive relationship with the thermally conductive surface 14 to exchange heat between the first fluid and the body of the first livestock animal 1 in contact with the surface 14. The first heatsink 20 may have a first heatsink inlet 24 for receiving the first fluid and a first heatsink outlet 26 for dispensing the first fluid from the heatsink 20.

The system 10 may further comprise a second element 30 which is positionable adjacent to the body of the second livestock animal 2 and is configured to transfer heat from a second fluid to the body of the first livestock animal 2. The second element 30 may have a second thermally conductive surface 32 for placing in contact with the body of the second livestock animal. Illustratively, the second fluid may also include water as well as other suitable fluids.

The second element 30 may include a second support 34 which may have the second thermally conductive surface 32 formed thereon, and may also include a second heatsink 40 which is in a thermally conductive relationship with the thermally conductive surface 32, such as may be provided on a second plate 36. Optionally, the second thermally conductive surface 32 may be formed directly on the second heatsink 40. The second heatsink 40 may have a second heatsink fluid passage 42 which is configured to carry or conduct the second fluid in a thermally conductive relationship with the thermally conductive surface 32 to exchange heat between the second fluid and the body of the livestock animal 2 in contact with the surface 32. The second heatsink 40 may have a second heatsink inlet 44 for receiving the second fluid and a second heatsink outlet 46 for dispensing the second fluid from the heatsink 40.

The system 10 may also include a heat exchange assembly 50 which is configured to transfer heat to the first fluid from the second fluid. The heat exchange assembly 50 may be in fluid communication with the first element 12 to receive the first fluid from the first element, and may also be in fluid communication with the second element 30 to receive the second fluid from the second element. The first exchange assembly 50 may include a first heat exchanger 52 which is configured to receive the first fluid from the first element 12. The first heat exchanger 52 may include a first exchanger fluid passage which is configured to carry the first fluid received from the first element. The first heat exchanger 52 may have a first exchanger inlet 56 and a first exchanger outlet 58 for the first fluid.

First conduits 60, 62 may connect the first heat exchanger 52 to the first heatsink 20, and more specifically the first conduit 60 may connect the first heatsink outlet 26 to the first exchanger inlet 56, and the first conduit 62 may connect the first exchange outlet 58 to the first heatsink inlet 24.

The heat exchange assembly 50 of the system 10 may further include a second heat exchanger 64 which is configured to receive the second fluid from the second element 30. The second heat exchanger 64 may include a second exchanger fluid passage which is configured to carry the second fluid received from the second element. The second heat exchanger 64 may have a second exchanger inlet 68 and a second exchanger outlet 70 for the second fluid.

Second conduits 72, 74 may connect the second heat exchanger 64 to the second heatsink 40, and more specifically the second conduit 72 may connect the second exchanger outlet 70 to the second heatsink inlet 44, and second conduit 74 may connect the second heatsink outlet 46 to the second exchanger inlet 68.

The heat exchange assembly 50 may also include a refrigeration apparatus 80 which may utilize a suitable refrigerant to facilitate the exchange of heat between the first and second element. The refrigeration apparatus 80 may include a condenser 82 which is configured to transfer heat from the refrigerant to the first fluid, and the condenser 82 may be in thermal communication with the first heat exchanger 52. The apparatus 80 may also include an evaporator 84 which is configured to transfer heat from the second fluid to the refrigerant, and the evaporator may be in thermal communication with the second heat exchanger 64. The refrigeration apparatus 80 may also include a compressor 86 which is configured to compress the refrigerant, and the compressor may be in fluid communication with the condenser 82 and the evaporator 84 in order to conduct refrigerant from the evaporator to the condenser. Further, the refrigeration apparatus 80 may include an expansion valve 88 which is configured to reduce the pressure of the refrigerant, and the valve 88 may be in fluid communication with the condenser 82 an evaporator 84 to receive refrigerant from the condenser and provide the refrigerant to the evaporator at a relatively lower pressure.

It will be appreciated by those skilled in the art that the refrigeration apparatus 80 may be provided with controls which are effective for controlling operation of the apparatus 80 as well as the amount of heat effectively transferred between the first 12 and second 30 elements, and by extension, the bodies of the first 1 and second 2 livestock animals.

The system 10 may also include a first pump 90 which is configured to circulate the first fluid between the first heatsink 20 and the first heat exchanger 52, and the pump 90 may be in fluid communication with the first heatsink outlet 26 of the first heatsink 20 as well as the first exchanger inlet 56 the first heat exchanger 52. Illustratively, the first pump 90 may be imposed between sections of the first conduit 60, although other configurations may be utilized.

A second pump 92 which is configured to circulate the second fluid between the second heatsink 40 and the second heat exchanger 64, and the pump 92 may be in fluid communication with the second exchanger outlet 70 of the second heat exchanger 64 as well as the second heatsink inlet 44 of the second heatsink 40. Illustratively, the second pump 92 may be imposed between sections of the second conduit 72, although other configurations may be utilized.

Optionally, the system 10 may include an auxiliary heater 94 which is configured to provide additional heat to the first element 12 when, for example, insufficient heat is provided by the second animal to provide a desired level of heat for the first animal (see, for example, FIG. 2). The auxiliary heater 94 may be configured to receive the first fluid from the first heat exchanger 52 and provide the first fluid to the first heatsink 20. In greater detail, the auxiliary heater 94 may be in fluid communication with the first exchanger outlet 58 of the first heat exchanger 52 and also in communication with the first heatsink inlet 24 of the first heatsink 20. Illustratively, the auxiliary heater may include a heat source utilizing, for example, electrical resistance or fuel combustion.

As a further option, the system 10 may include an auxiliary heat exchanger 96 which is configured to remove heat from the first fluid prior to the first fluid passing through the first heatsink 20 of the first element, such as in times when less heat, or no heat, is needed or desired to be provided to the first animal 1. The auxiliary heat exchanger 96 may be configured to receive the first fluid from the first heat exchanger 52, and may be in fluid communication with the first exchanger outlet 58 of the first heat exchanger. The auxiliary heat exchanger 96 may be configured to transfer heat from the first fluid to an auxiliary fluid, which may comprise, for example, environmental air or a liquid such as water. The auxiliary heat exchanger may have an auxiliary fluid inlet 98 for receiving the auxiliary fluid and an auxiliary fluid outlet 100 for exhausting the auxiliary fluid that is passed through the auxiliary heat exchanger. In some embodiments, the auxiliary heat exchanger 96 may be configured to provide the first fluid to the first heatsink 20, and may be in fluid communication with the first heatsink inlet 24 of the heatsink 20. In other embodiments, the first fluid may selectively be bypassed from moving through the first heatsink 20 by utilizing a bypass line 102 which is configured to permit the first fluid to flow from the auxiliary heat exchanger to, for example, the first exchanger inlet 56 of the first heat exchanger 52 and may pass through the first pump 90.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system for transferring heat between a body of a first livestock animal and a body of a second livestock animal, the system comprising:
a first element having a first plate with a first thermally conductive surface for resting the first livestock animal thereon, the first element being configured to transfer heat between a first fluid and the first thermally conductive surface in contact with the body of the first livestock animal when the body of the first livestock animal rests thereon, the first element including a first heatsink in a thermally conductive relationship with the first thermally conductive surface of the first plate;
a second element having a second plate with a second thermally conductive surface for resting the second livestock animal thereon, the second element being configured to transfer heat between a second fluid and the second thermally conductive surface in contact with the body of the second livestock animal when the body of the second livestock animal rests thereon, the second element including a second heatsink in a thermally conductive relationship with the second thermally conductive surface of the second plate;
a heat exchange assembly configured to transfer heat to the first fluid from the second fluid for thereby transferring heat from a first livestock animal when resting on the first thermally conductive surface of the first element to a second livestock animal when resting on the second thermally conductive surface of the second element, the heat exchange assembly being in fluid communication with the first element to receive the first fluid from the first element, the heat exchange assembly being in fluid communication with the second element to receive the second fluid from the second element, the heat exchange assembly comprising:
a first heat exchanger configured to receive the first fluid from the first element;
a first pump configured to circulate the first fluid between the first heatsink and the first heat exchanger;
a second heat exchanger configured to receive the second fluid from the second element;
a second pump configured to circulate the second fluid between the second heatsink and the second heat exchanger;
a refrigeration apparatus utilizing a refrigerant to exchange heat between the first and second heat exchangers, the refrigeration apparatus comprising:
a condenser in thermal communication with the first heat exchanger to transfer heat from the refrigerant to the first fluid via the first heat exchanger;
an evaporator in thermal communication with the second heat exchanger to transfer heat from the second fluid to the refrigerant via the second heat exchanger;
a compressor in fluid communication with the condenser and the evaporator to conduct refrigerant from the evaporator to the condenser and compress the refrigerant moving from the evaporator to the condenser;
an expansion valve in fluid communication with the condenser and the evaporator to receive refrigerant from the condenser and provide the refrigerant to the evaporator and reduce a pressure of the refrigerant.

2. The system of claim 1 additionally comprising an auxiliary heater configured to provide additional heat to the first fluid provided to the first element.

3. The system of claim 2 wherein the auxiliary heater is configured to receive the first fluid from the first heat exchanger and provide the first fluid to the first heatsink.

4. The system of claim 1 additionally comprising an auxiliary heat exchanger configured to remove heat from the first fluid prior to the first fluid passing through a first heatsink of the first element, the auxiliary heat exchanger being configured to transfer heat from the first fluid to an auxiliary fluid.

5. The system of claim 4 wherein the auxiliary heat exchanger is configured to receive the first fluid from the first heat exchanger.

6. The system of claim 4 wherein the auxiliary heat exchanger has a bypass line configured to selectively permit the first fluid to bypass the first heatsink.

7. The system of claim 1 wherein the first heatsink has a first heatsink fluid passage configured to conduct the first fluid in a thermally conductive relationship with the first thermally conductive surface to exchange heat between the first fluid and the body of the first livestock animal in contact with the first thermally-conductive surface when the body of the first livestock animal is resting thereon.

8. The system of claim 7 wherein the second heatsink has a second heatsink fluid passage configured to conduct the second fluid in a thermally conductive relationship with the second thermally conductive surface to exchange heat between the second fluid and the body of the second livestock animal in contact with the second thermally-conductive surface when the body of the second livestock animal is resting thereon.

9. The system of claim 1 additionally comprising:
an auxiliary heat exchanger configured to remove heat from the first fluid prior to the first fluid passing through the first heatsink of the first element, the auxiliary heat exchanger being configured to transfer heat from the first fluid to an auxiliary fluid;
wherein the auxiliary heat exchanger is configured to receive the first fluid from the first heat exchanger; and
wherein the auxiliary heat exchanger has a bypass line configured to selectively permit the first fluid to bypass the first heatsink.

* * * * *